(12) United States Patent
Endler et al.

(10) Patent No.: US 11,441,630 B2
(45) Date of Patent: Sep. 13, 2022

(54) STOP BUFFER

(71) Applicant: Conductix-Wampfler GmbH, Weil am Rhein (DE)

(72) Inventors: Niklas Endler, Schwörstadt (DE); Bernd Maier, Schliengen (DE); Nicholas Winter, Lörrach (DE)

(73) Assignee: Conductix-Wampfler GmbH, Weil am Rhein (DE)

( * ) Notice: Subject to any disclaimer, the term of this patent is extended or adjusted under 35 U.S.C. 154(b) by 138 days.

(21) Appl. No.: 16/467,158

(22) PCT Filed: Nov. 14, 2017

(86) PCT No.: PCT/EP2017/079174
§ 371 (c)(1),
(2) Date: Jun. 6, 2019

(87) PCT Pub. No.: WO2018/104010
PCT Pub. Date: Jun. 14, 2018

(65) Prior Publication Data
US 2019/0316647 A1    Oct. 17, 2019

(30) Foreign Application Priority Data
Dec. 7, 2016  (DE) ............... 10 2016 123 696.9

(51) Int. Cl.
*F16F 3/10* (2006.01)
*H04B 1/02* (2006.01)

(52) U.S. Cl.
CPC ............ *F16F 3/10* (2013.01); *H04B 1/02* (2013.01); *F16F 2230/0047* (2013.01);
(Continued)

(58) Field of Classification Search
CPC ...... F16F 3/10; F16F 2232/08; F16F 2236/04; F16F 2230/08; F16F 2230/0047;
(Continued)

(56) References Cited

U.S. PATENT DOCUMENTS 3,308,903 A    3/1967 Sobel et al.
3,853,199 A    12/1974 Hirashima et al.
(Continued)

FOREIGN PATENT DOCUMENTS

DE    41 21 497 A1    2/1993
DE    296 06 256 U1   6/1996
(Continued)

OTHER PUBLICATIONS

English translation of International Preliminary Report on Patentability dated Jun. 11, 2019 and Written Opinion for PCT/EP2017/079174 filed Nov. 14, 2017.
(Continued)

*Primary Examiner* — Xuan Lan Nguyen
(74) *Attorney, Agent, or Firm* — Paul D. Bianco; Katharine Davis Wong; Fleit Intellectual Property Law

(57) ABSTRACT

A stop buffer for absorbing kinetic energy in a collision between two objects, includes a first spring body made of an elastic material. The first spring body is connected to a carrier body, and includes at least one electrical sensor, which has a triggering element that can be mechanically actuated. The sensor outputs a signal when the triggering element is actuated. The sensor is arranged relative to the carrier body in such a way that the triggering element is actuated by a detachment of the first spring body from the carrier body, or an actuation mechanism is provided, by which the triggering element of the sensor is actuated by a force acting on the carrier body in a collision when the force exceeds a predefined magnitude that indicates a failure of
(Continued)

the first spring body because of wear or, if the first spring body is intact, indicates excessive collision energy.

10 Claims, 6 Drawing Sheets

(52) U.S. Cl.
CPC ....... *F16F 2230/08* (2013.01); *F16F 2232/08* (2013.01); *F16F 2236/04* (2013.01)

(58) Field of Classification Search
CPC ........ F16F 15/085; F16F 9/3292; H04B 1/02; H04B 1/03
See application file for complete search history.

(56) References Cited

U.S. PATENT DOCUMENTS

| | | | |
|---|---|---|---|
| 3,936,621 A * | 2/1976 | Palin | B01J 19/0053 200/61.08 |
| 3,986,577 A | 10/1976 | Ebbesson et al. | |
| 5,793,005 A * | 8/1998 | Kato | H01H 3/142 200/61.45 R |
| 6,203,079 B1 | 3/2001 | Breed | |
| 7,347,464 B2 * | 3/2008 | Tanabe | B60R 19/483 180/274 |
| 7,677,372 B2 | 3/2010 | Maier | |
| 8,635,916 B1 | 1/2014 | Loverich et al. | |
| 2015/0369328 A1 | 12/2015 | Sautier et al. | |

FOREIGN PATENT DOCUMENTS

| | | |
|---|---|---|
| DE | 102006005720 B3 | 5/2007 |
| WO | 2006/051107 A1 | 5/2006 |
| WO | 2014/043940 A1 | 3/2014 |

OTHER PUBLICATIONS

International Search Report dated Jan. 29, 2018 for PCT/EP2017/079174 filed Nov. 14, 2017.
Written Opinion for PCT/EP2017/079174 filed Nov. 14, 2017.
Search Result of German Patent Application No. 10 2016 123 696.9 filed Dec. 7, 2016.
Examination Report for German Application No. 17800497.4 dated Feb. 26, 2021.

* cited by examiner

STOP BUFFER

FIELD OF THE INVENTION

The invention concerns a stop buffer. Such stop buffers are used, for example, in carriages and stationary couplers of trailing cables whose carriages regularly strike each other during collision and against the coupler of which the first carriage regularly comes into contact.

BACKGROUND OF THE INVENTION

Because of their function, stop buffers are repeatedly exposed to brief high mechanical loading, which with time leads unavoidably to wear. Stop buffers therefore require regular maintenance in the form of inspections and, when required, namely when wear exceeds a tolerable extent, replacement. Inspections are labor-intensive if a stop buffer is arranged in an exposed and/or poorly accessible location, for example, in a trailing cable of a large crane system, which is usually situated at great height. Moreover, despite regular maintenance, stop buffers can fail abruptly, which results in vibrations of increased intensity when an object with a defective stop buffer collides with another object until the next planned inspection occurs or failure is noticed because of the increased development of noise during collisions.

DE 296 06 256 U1 discloses a shock absorber for a high-bay warehouse with a housing as well as a piston guided therein and supported against a damping medium, on which a piston rod engages, which carries a ram element on its outer free end. To detect the position of the piston rod, a position sensor designed as a proximity switch is integrated within the piston or the piston rod. The position sensor indicates whether the piston rod is in the extended position and the shock absorber is therefore ready for the intended absorption of a shock on the ram element or not. The position sensor during each absorption of a shock by the shock absorber indicates deflection of the piston rod from the extended position until the piston is returned to its initial position.

U.S. Pat. No. 6,203,079 B1 discloses an impact damper provided for mounting on the rear of a truck parked in an impact-prone area. The acceleration of the front of a shock absorber caused by impact of another vehicle is measured and the damping constant of a hydraulic damper is set as a function of this acceleration.

DE 41 21 497 A1 also shows an impact damper in the field of vehicles in which the speed of motion of a vehicle shock absorber mounted to move is measured after a collision and a blocking mechanism is actuated to block further movement if this speed lies above a predetermined threshold.

SUMMARY OF THE INVENTION

One aspect of the invention relates to diagnosis of the condition of a stop buffer.

A stop buffer with impact detection and/or failure detection and wireless data transfer is disclosed. Advantageous modifications and embodiments are also disclosed.

A stop buffer according to the invention for absorption of kinetic energy during a collision between two objects, comprising a first spring body made of an elastic material, which first spring body is connected to a carrier body, and comprising at least one electrical sensor, which has a triggering element that can be mechanically actuated, the sensor outputting a signal when the triggering element is actuated and the sensor being arranged relative to the carrier body in such a way that the triggering element is actuated by means of a detachment of the first spring body from the carrier body, or an actuating mechanism is provided, by means of which the triggering element of the sensor is actuated by means of a force acting on the carrier body during a collision when said force exceeds a predefined magnitude that indicates a failure of the first spring body due to wear or, if the first spring body is intact, excessive collision energy.

Thus, on the one hand, the force acting on the carrier body during collisions, whose intensity is changed by wear of the first spring body that comes into contact with the colliding object during a collision, can be determined and excess wear of the first spring body can be recognized with reference to the occurrence of an unduly large force and/or total failure of a stop buffer can be determined in the form of loosening of the first spring body from the carrier body to which it is fastened on the back. The need for replacement of a worn or defective stop buffer can be recognized in this way before the objects that are protected by the stop buffer during collisions are damaged owing to insufficient action of the stop buffer during collisions. Costly regular on-site inspections by maintenance personnel are unnecessary.

An appropriate actuation mechanism can be simply implemented in which the carrier body is movably mounted on a support body and has a rest position in which it is held by a bias of at least a second spring body at a predefined distance from the support body. By coordination of the elasticity of the second spring body relative to the first spring body, the response threshold of the sensor can be deliberately adjusted to a desired value. It is particularly expedient for connection of the carrier body to the support body that a flange connected to the support body enclose the carrier body and form a stop against which the carrier body is forced into the rest position by the second spring body. Only a minimal number of components is therefore required for the actuation mechanism.

A sensor is preferably arranged in a cavity formed on the back of the carrier body or on the front of the support body. For its actuation, the sensor preferably has at least one actuation element projecting from a housing of the sensor, which is deflected upon approach of the carrier body to the support body and thereby causes actuation of the triggering element of the sensor. The sensor in this arrangement is enclosed by the carrier body and the support body as well as the flange and is therefore protected from unfavorable surrounding conditions, for example, against weather when used outdoors. The sensor is expediently fastened in the cavity by a clamp, which is fastened to the carrier body or the support body.

In order to be able to detect the particularly critical total failure of a stop buffer, it is advantageous that a sensor be held by a first spring body against the carrier body, so that its triggering element is actuated when the connection between the first spring and the carrier body is released. A defect in the form of a missing spring body can thereby be reliably determined, and damage from unbuffered collisions of the object, on which the stop buffer has lost the first spring body, can be avoided.

The sensor preferably has an actuation element projecting from the housing, which is biased by the spring force in a rest position and which triggers release of a signal by the sensor when it is moved back into the rest position from a position deflected from the rest position. This functional design of the sensor has the underlying objective of placing the actuation element in the deflected state during incorporation of the sensor in the stop buffer and keeping it in this state as long as the first spring body is connected to the carrier body, so that separation of the first spring body from the carrier body reliably triggers release of the sensor signal.

The sensor is preferably arranged in a cavity formed on the back of the first spring body or in a cavity formed on the front of the carrier body. For fastening the sensor in the first spring body, a holding element is preferably arranged, which fixes the sensor in the cavity in a position in which the actuation element has a position deflected from the rest position when the first spring body is connected to the carrier body. Thus, the previously mentioned monitoring function can be implemented with a minimal demand for components and the sensor is situated in the interior of a closed-off space and is not exposed to any environmental effects that might compromise its function, such as weather when used outdoors.

If both wear of the first spring body and its detachment from the carrier body are to be detected, then two sensors can be provided, one of which is arranged relative to the carrier body, so that its triggering element is actuated by a force acting on the carrier body during a collision, and the other is arranged relative to the carrier body, so that its triggering element is actuated by separation of the first spring body from the carrier body. Comprehensive monitoring of the functional capability of the stop buffer is thereby ensured.

The sensor preferably contains an electromechanical energy transducer that converts the mechanical movement of the triggering element into electrical energy and a sensor is supplied with electrical energy exclusively from the electromechanical energy transducer. Not only is laying of power supply lines to the sensor thereby made unnecessary, but battery operation, which would again require regular maintenance in the form of replacement of batteries, is also avoided.

It is also advantageous that the sensor contains the transmitter that emits the signal of the sensor in wireless fashion when it is supplied an electrical pulse with a predetermined minimum energy from the electromechanical energy transducer. The energy transducer functions in this way simultaneously as a power source and initiator of release of the sensor signal. Because of wireless emission, signal lines are also unnecessary, the laying of which in stop buffers arranged on moving objects is generally undesired.

The sensor preferably contains a transmitter that emits the signal of the sensor in wireless fashion and the sensor contains a memory with a sensor-specific code that is a component of the signal emitted by the transmitter This permits pinpointing of the stop buffer recognized by the sensor to be worn out or defective when there are a number of stop buffers to be monitored and with wireless communication between the sensors and a stationary central monitoring unit.

BRIEF DESCRIPTION OF THE DRAWINGS

The invention is described below by means of a detailed embodiment example with reference to the accompanying drawings. These show.

DETAILED DESCRIPTION OF THE INVENTION

Figure 1:
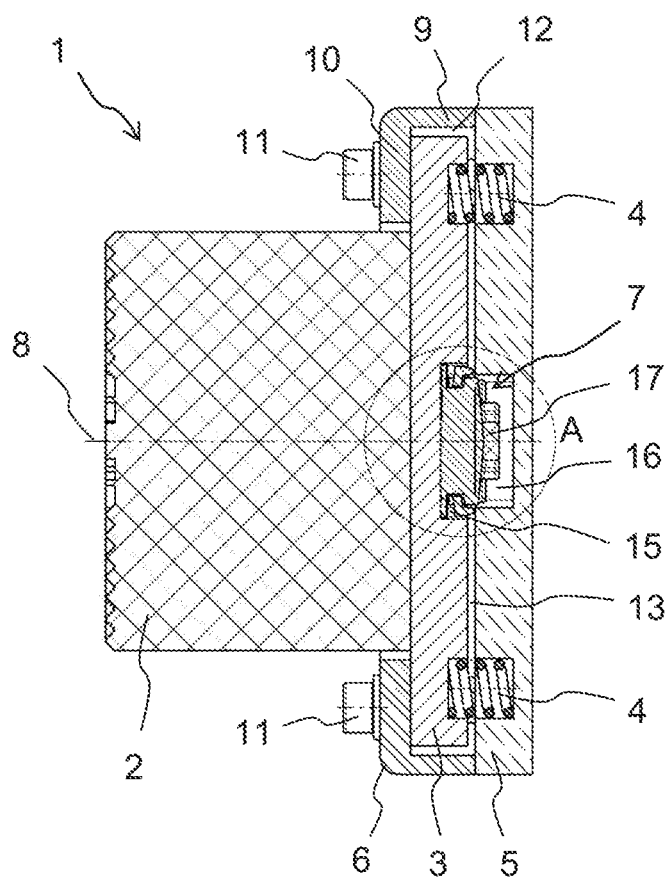
FIG. 1 a side sectional view of a stop buffer according to the invention in the rest state, FIG. 2 a detail view of section A from FIG. 1.

As shown in FIG. 1, a stop buffer 1 according to the invention has a first spring body 2 as main component, which can be cylindrical or cuboid, a stiff plate-like carrier body 3, second helical spring body 4, a stiff plate-like support body 5, a stiff fastening flange 6, and a sensor 7. Stiff here means that the elasticity is negligibly small in comparison with that of the first spring body 2. The support body 5 is fastened on its back facing away from carrier body 3 to a moving or stationary object, not shown in FIG. 1, which is regularly exposed during its operation to collisions with another object. This other object can therefore be equipped with a stop buffer 1 of the same type.

The first spring body 2, which can consist of rubber or cellular polyurethane elastomer, is intended to deform elastically in the direction of axis 8 during a collision with another object occurring on its front, which is the left side in FIG. 1, and in so doing to absorb part of the kinetic energy of the objects involved in the collision. It is firmly connected on its back to the front of the carrier body 3. For example, this connection can be produced by screws that pass through holes in the carrier body 3 and through threaded bushings embedded in the first spring body 2, to which said screws are attached. Via the second spring body 4 the carrier body 3 is elastically supported on the back against the support body 5.

The carrier body 3 projects laterally, i.e., perpendicular to axis 8 on all sides above the first spring body 2 and is fastened to the support body 5 by means of fastening flange 6, which encloses it preferably on all sides in the axial direction with an axial section 9. In this case, the axial section 9, i.e., the section running in the direction of axis 8, is supported on an edge area of the front of support body 5 facing carrier body 3, whereas a lateral section 10 of the fastening flange 6 running perpendicular thereto lies on an edge area of the front of carrier body 3. The fastening flange 6 is fastened to the support body 5 by means of several axial screws 11 that pass through holes in the lateral section 10 of the fastening flange 6 and in the edge area of carrier body 3 covering it. Only the heads of two of these screws 11 are visible in FIG. 1, since the screws 11 are offset perpendicular to the plane of FIG. 1. The thickness of the carrier body 3 is somewhat smaller than the axial depth of the cavity 12 formed by the fastening flange 6 on its back, which is defined by the length of the axial section 9 of the fastening flange 6, so that the carrier body 3 has axial play between the lateral section 10 of the fastening flange 6 and the front of support body 5.

Figure 3:
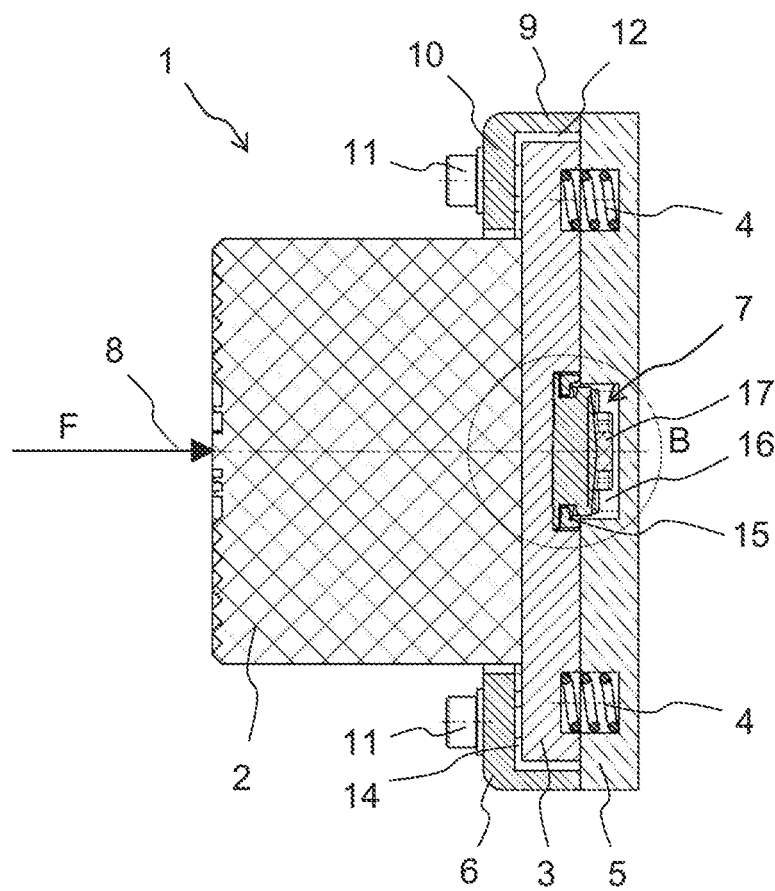

The second spring body 4 in the installed state of the stop buffer 1 is under compressive stress in order to force the carrier body 3 against the back of the lateral section 10 of the fastening flange 6, so that the carrier body 3 and the first spring body 2 assume a defined axial rest position despite said axial play, in which a first gap 13 exists between the back of carrier body 3 facing away from the first spring body 2 and the front of support body 5 facing carrier body 3. The carrier body 3, however, can be moved in the axial direction relative to support body 5 and fastening flange 6 by exerting an axial pressure force F on the first spring body 2, the magnitude of which is greater than a predetermined threshold, until the back of the carrier body 3 stops against the front of support body 5. A second gap 14 of equal width then exists instead of the first gap 13 between the front of carrier body 3 facing the first spring body 2 and the back of the lateral section 10 of the fastening flange 6. This situation is depicted in FIG. 3.

Figure 2:
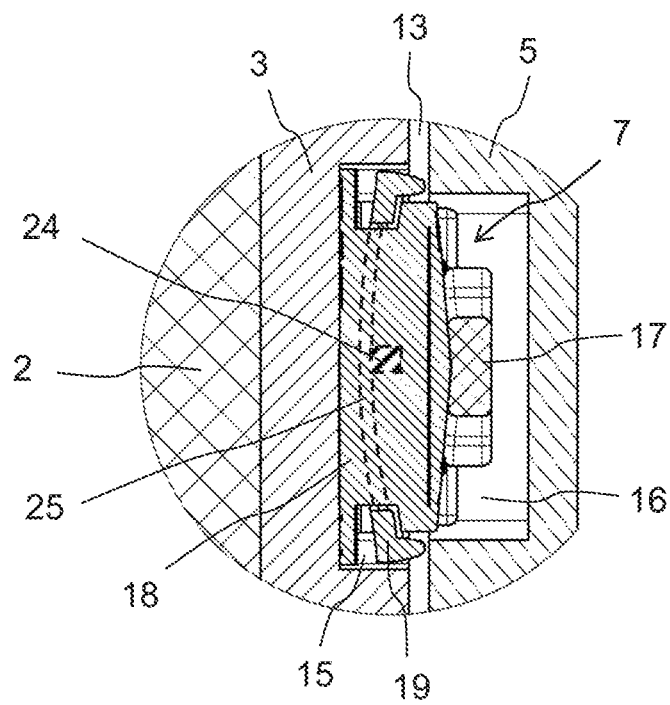
FIG. 2A shows a sensor entirely in a recess formed on the back side of the carrier body.
FIG. 2B shows a sensor entirely in a recess formed on the front side of the support body, FIG. 3 a side sectional view of a stop buffer according to the invention exposed to a force caused by a collision, FIG. 4 a detail view of section B from FIG. 3, FIG. 5 a side sectional view of another embodiment of a stop buffer according to the invention in the rest state, FIG. 6 a detail view of section C from FIG. 5 and FIG. 7 a side sectional view of the embodiment of FIG. 5 in another plane rotated by 90° relative to FIG. 5.

Opposite recesses 15 and 16 are formed preferably symmetric to axis 8 in the center region of the back of carrier body 3 and in the center region of the front of support body 5, which together form a cavity that passes laterally into the first gap 13 in the rest position of carrier body 3. A sensor 7 is arranged in the cavity. It is connected by a fastening clamp 17 to carrier body 3 and is held in recess 15 by this fastening clamp 17. The function of the sensor 7 is explained below with reference to FIG. 2, in which an enlargement of cutout B of FIG. 1 is shown.

Sensor 7 has a housing 18 which is fastened by the fastening clamp 17 connected to carrier body 3 in the recess 15 of carrier body 3 and forced axially against the base of recess 15. A triggering element 24, on whose actuation the sensor issues a wireless signal, and an actuation mechanism for the triggering element 24, are situated within housing 18. The actuation mechanism consists of a leaf spring 25 mounted in housing 18, which is arranged roughly parallel to the facing surfaces of carrier body 3 and support body 5 and is arched in its rest position, so that its ends are farther from the base of recess 15 of carrier body 3 than its center. Roughly rectangular angle pieces 19 are fastened to both ends of this leaf spring 25, so that the direction of one arm of an angle piece 19 corresponds to the direction of the end of the leaf spring 25 and the other arm points in the direction of the support body 5.

Figure 2A:
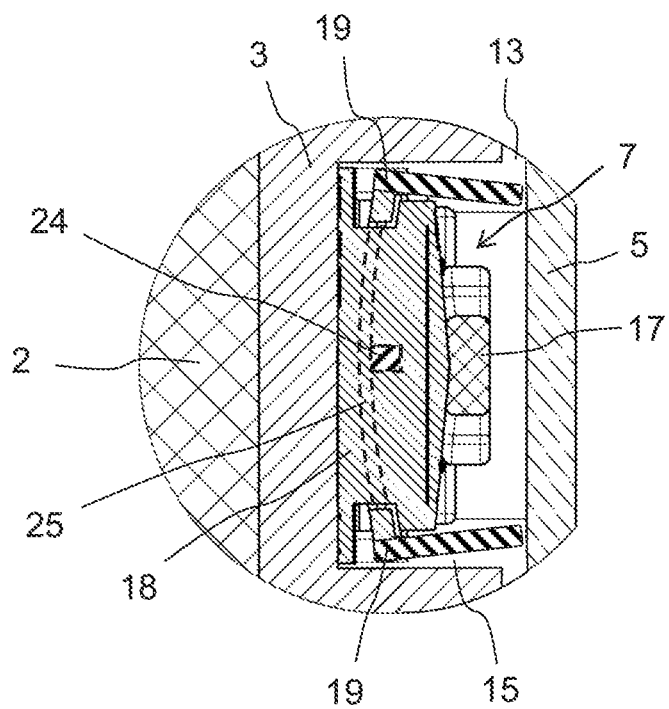
Figure 2B:
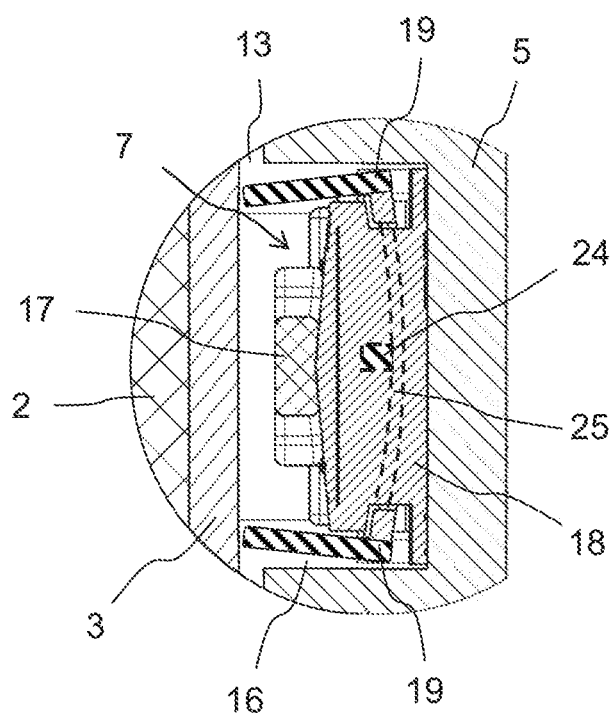

As is shown in FIG. 2A and FIG. 2B, it is also possible to arrange sensor 7 entirely in a single recess 15 of sufficient depth formed on the back side of the carrier body 3 or entirely in a single recess 16 of sufficient depth formed on the front side of the support body 5.

The recess 15 of the carrier body 3 extends farther in the lateral direction than the recess 16 of the support body 5, and the length of the leaf spring 25 and the arm lengths of the angle pieces 19 are chosen such that the arms that point in the direction of the support body 5 are situated laterally on the other side of recess 16 of support body 5. These arms of the angle pieces 19 also extend laterally beyond the region of housing 18 situated between the leaf spring 25 and the fastening clamp 17. This region of the housing 18 has smaller lateral dimensions than the recess 16 of the carrier body 5 such that it can extend with the fastening clamp 17 into this recess 16. In the rest state of the stop buffer 1 depicted in FIG. 2, the ends of the arms of the angle pieces 19 pointing to the carrier body 5 extend in the axial direction into the first gap 13 and have only very limited spacing from the front of the carrier body 5.

Figure 4:
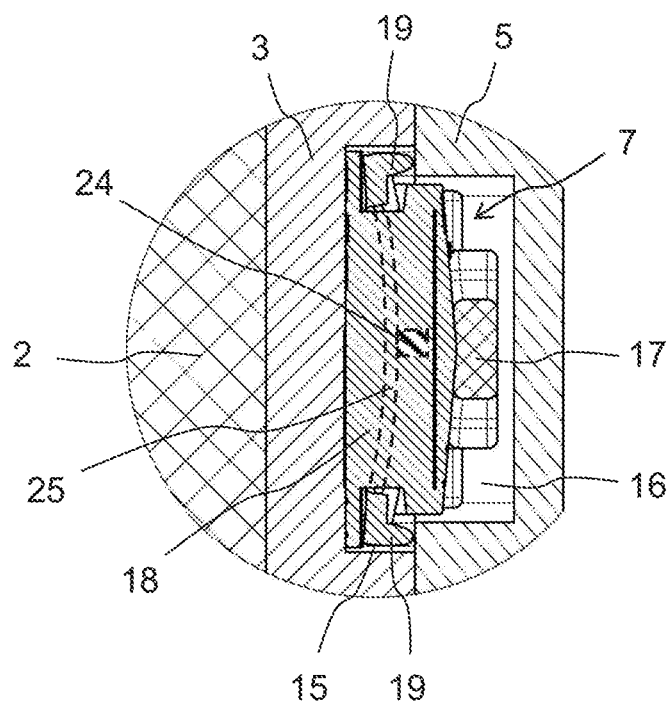

As shown in FIGS. 3 and 4, when the front of the first spring body 2 of the stop buffer 1 is exposed to an axial force F, the magnitude of which exceeds a predetermined threshold, the second spring body 4 is compressed, so that the back of the carrier body 3 stops against the front of support body 5 and the first gap 13 disappears. The sensor unit 7 and the fastening clamp 17 extend in this state more deeply into the recess 16 in the support body 5 than in the rest position. This is readily apparent from comparison of FIG. 4, which shows cutout B from FIG. 3, with FIG. 2. In contrast to FIG. 2, the ends of the angle pieces 19 facing the support body 5 are now in contact with the front of the support body 5 outside of its recess 16 and are forced back into the recess 15 of carrier body 3 against the spring force of the leaf spring 25, so that the leaf spring 25 within housing 18 is now arched in the opposite direction in comparison with FIG. 2. This can be caused, for example, by a symmetric off-center positioning of the leaf spring 25 at two locations.

The center of the leaf spring 25 in its rest position, i.e., in the rest state of stop buffer 1, is in mechanical contact with the triggering element 24 of sensor 7 situated within housing 18 or is in its immediate vicinity. On transition of the leaf spring 25 in the direction opposite the arch as a result of deflection of the carrier body 3 in the direction of support body 5 by the action of force F, the center section of the leaf spring 25, which then moves in the axial direction, actuates the triggering element 24 of sensor 7, and, in so doing, ensures the release of a signal that consequently indicates that the stop buffer 1 was exposed to an axial force F above a predetermined threshold. According to the function of a stop buffer 1, the cause of such a force F is that the kinetic energy acting on the carrier body 3 from a collision between the object, on which the stop buffer 1 is arranged, and another object, was above a predetermined threshold.

The threshold for triggering of signal release by sensor 7 is determined by the elasticities of the first spring body 2 and the second spring body 4 and can therefore be adjusted at a given elasticity of the first spring body 2 by a corresponding choice of the elasticity of the second spring body 4 to a desired value. The greater the stiffness with which the second spring body 4 is designed, the higher the triggering threshold of sensor 7. During failure of the first spring body 2 in the form of partial structural separation from wear, the energy absorption capability of the first spring body 2 diminishes. This leads to an increase in amplitude of the impulse force acting on the carrier body 3 during a collision, and triggering of the sensor 7 therefore occurs, which indicates the defective state of the stop buffer 1.

Additionally, however, the invention also permits recognition of an inadmissibly high load on an intact stop buffer 1 in the presence of an intact spring body 1 by unduly high collision energy, in which such a load, despite the damping effect of spring body 2, leads to overcoming of the bias of spring body 2 by the impulse force acting on the carrier body 3 and consequently to triggering of the release of the signal by sensor 7.

Finally, the elasticity of the second spring body 4 could also be chosen such that each normal collision with admissible kinetic energy leads to triggering of sensor 7. In this case, the number of collisions during an established period can be chosen and during operation of a system with moving objects that are equipped with stop buffers 1 according to the invention, the collision frequency of the object can be determined for the purpose of optimization of operation. In this case a defective operating state of the system could also be recognized by the absence of normally expected collision events.

It is understood that the sensor 7 could also be arranged in a position rotated 180° in the recess 16 of support body 5. In this case, the recess 16 of support body 5 must have a larger lateral extent in the sectional view of FIGS. 1 to 4 than the recess 15 of the carrier body 3, so that the angle pieces 19 project laterally beyond the recess 15 of the carrier body 3 and during an axial displacement of the carrier body 3 would be deflected by them. The fastening clamp 17 must then be connected to the support body 5 and fix the sensor 7 on the support body 5, i.e., force it against the base of recess 16 of the support body.

The sensor 7 contains an electromechanical energy transducer in housing 18, which converts a mechanical movement of its triggering element 24 into electrical energy. Such an energy transducer can operate piezoelectrically or electrodynamically. A radio transmitter is connected to the electromechanical energy transducer, which obtains the electrical power required for its operation exclusively from the electromechanical energy transducer. In this way a wired power supply for the sensor and wired signal transmission are unnecessary and neither is a battery required for operation. This is a particular advantage during arrangement of stop buffers 1 in exposed and/or poorly accessible locations.

Although the amount of energy that can be generated by deflection of a leaf spring of limited dimensions is relatively small, it is sufficient that a radio signal that indicates exposure of a stop buffer 1 to a force above a predetermined threshold be output, since no bidirectional communication is required for this purpose and the signal need only contain a limited amount of data and can be correspondingly short. Sensors with an integrated electromechanical energy transducer that do not require a power supply for operation are state of the art and therefore need not be explained here. For example, such an energy transducer and a sensor equipped therewith are disclosed in EP 1 389 358 B 1.

If the carrier body 3 and the support body 5 both consist of metal, a transmitting antenna of the sensor can be brought out from the cavity formed by recesses 15 and 16 through a hole or groove on the surface of one of the two elements in order to overcome the shielding of sensor 7 by the two metal elements 3 and 5.

As an alternative to a number of helical second spring bodies 4, second spring bodies of a different form, for example, leaf springs, could also be used, or only a single second spring body in the form of a disk spring could be used. The actuation mechanism to trigger signal release by the sensor 7 could also be designed within the housing 18 differently than described here.

Figure 5:
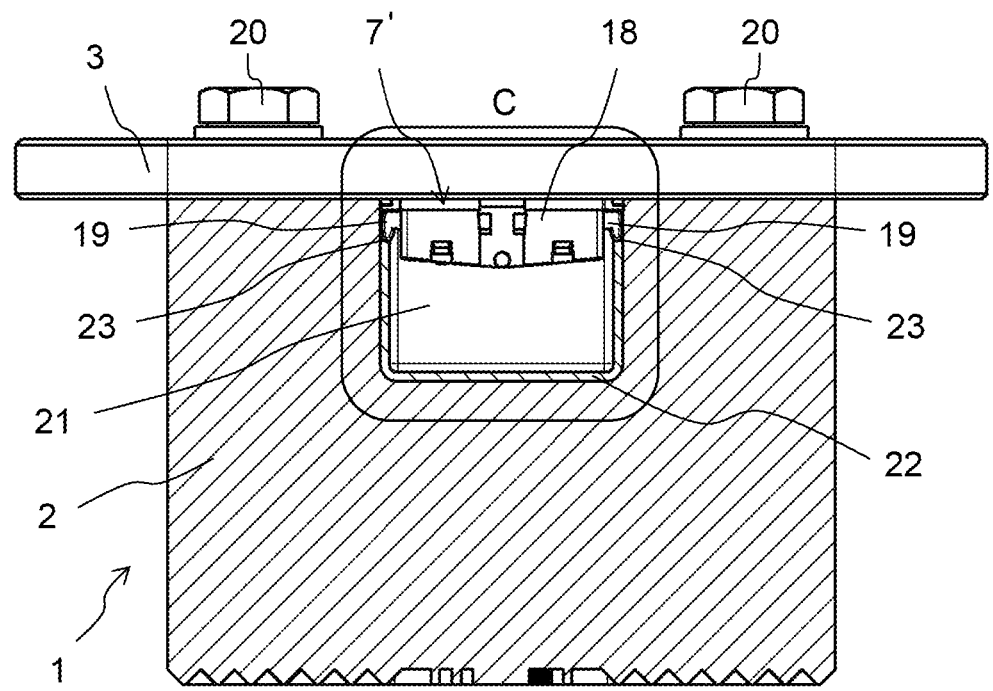
Figure 6:
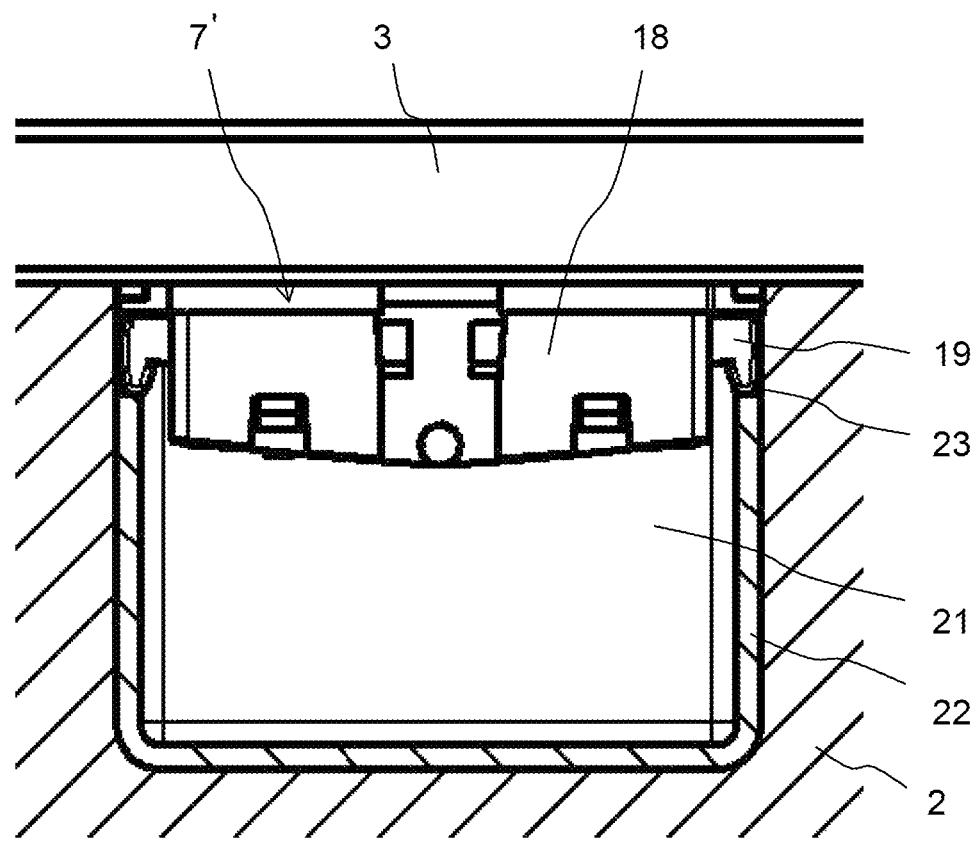
Figure 7:
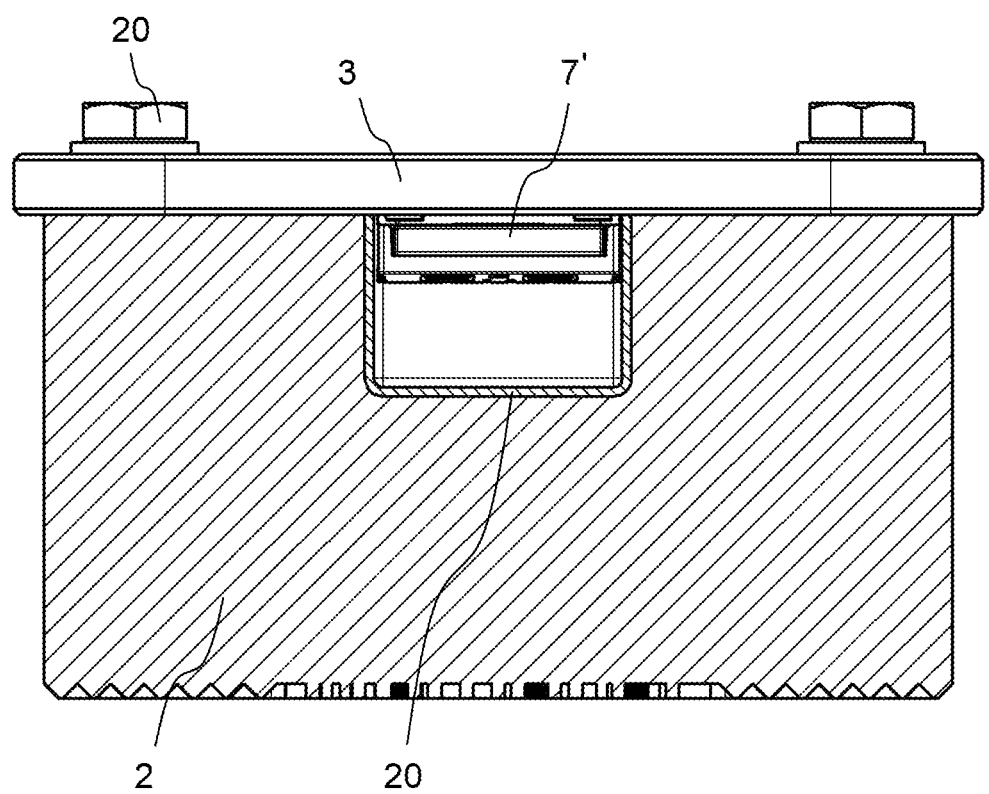

A second embodiment of the invention by means of which a defect can be detected on a stop buffer 1, is shown in FIGS. 5 to 7. This embodiment, as required, can be used in combination with the first embodiment (combination shown in FIG. 8) or as an alternative thereto. It is intended to detect a defect in the form of a separation of first spring body 2 of stop buffer 1 from the carrier body 3 to which it is fastened. As already explained with reference to the first embodiment, the first spring body 2 is fastened to the carrier body 3 by means of screws 20, only the heads of which are visible in FIG. 5. Threaded bushings are embedded in spring body 2 for this purpose, into which the screws 20 are introduced, passing through the carrier body 3. The first spring body 2 lies with its back flat on the front of carrier body 3.

As can be seen in FIG. 5 and more clearly in the cutout enlargement from FIG. 6, a cavity 21 is formed in the first spring body 2 on its back facing the carrier body 3, into which a cup-shaped insert 22 is inserted such that its open side faces the back of the first spring body 2 and is closed off flush with the back of the first spring body 2. A sensor 7' of the same type as already provided in the first embodiment (sensor 7) is inserted into insert 22. The insert 22 is adapted to the lateral dimensions of housing 18 of sensor 7', including the angle pieces 19 projecting from it laterally, and has cutouts 23 on two opposite sides into which angle pieces 19 extend such that their axial arms lie on insert 22 in cutouts 23.

The depth of the cutouts 23 is dimensioned such that the triggering element of the sensor 7' is actuated when the first spring body 2 is fastened to the carrier body 3 with screws 20. When the back of the first spring body 2, and therefore the open side of insert 22, is in contact with the front of carrier body 3, the housing 18 of the sensor 7' is then forced against the front of carrier body 3, in which case, the transfer of force to the housing 18 of sensor 7' occurs from the first spring body 2 via insert 22, angel pieces 19, and the leaf spring in the interior of housing 18 to which the angle pieces 19 are fastened. The angle pieces 19 are then deflected from their rest position, and the leaf spring is also moved from its rest position into a deflected position with a different arch. It can then actuate the triggering element of sensor 7' and cause sensor 7' to output a signal.

What matters is that the release of the sensor signal be triggered by movement of the leaf spring back into its rest position with the terminal angle pieces 19. Such a movement occurs when the first spring body 2 is destroyed by wear to an extent that its fastening via screws 20 to carrier body 3 is loosened and it separates from carrier body 3 as a result of gravity. In this case, the leaf spring of the sensor 7' with the angle pieces 19 that are elastically tightened in their deflected position is automatically moved back into its rest position and then actuates the triggering element of the sensor 7', whereupon it releases the signal. This signal then indicates the serious defect of complete loosening of the first spring body 2 from the carrier body 3.

It is apparent from FIG. 7, which shows a lateral sectional view of the second embodiment in another sectional plane rotated 90° relative to FIG. 5, that the cup-like insert 22 on the side facing away from the cutouts 23 visible in the sectional views of FIGS. 5 and 6 extends to the back of the first spring body 2 and is closed off flush therewith, so that it lies against the front of the carrier body 3 in the installed state of the first spring body 2. Thus, in conjunction with an appropriate depth of cutouts 23, a defined position of the sensor 7' is obtained in which the leaf spring of the sensor 7' is fastened in its deflected position. As long as the insert 22 lies against the front of carrier body 3, the sensor 7' is held in this position. The insert 22 is designed to be stiff in comparison with the first spring body 2, especially made from metal, so that during impact of another object on the front of the first spring body 2, it does not deform, in contrast to this object, and the position of the housing 18 of the sensor 7' is therefore retained.

In an alternative embodiment not shown, a sensor could also be arranged in a cavity on the front of carrier body 3 and be fixed in this cavity by a holding element embedded in the first spring body 2 on its back in a position in which the angle pieces 19 are deflected by said holding element such that, even in this case, the triggering element of the sensor is actuated during incorporation and would then be held in this position. During separation of the first spring body 2 from the carrier body 3, unloading of angel pieces 19 would occur and the leaf spring would be moved back in the interior of the sensor to its rest position and trigger another release of the sensor signal and therefore report said separation.

Figure 8:
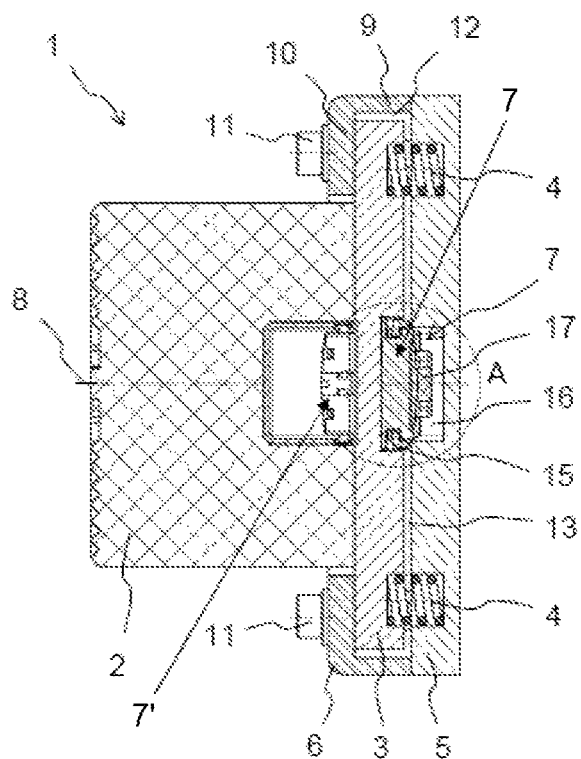
FIG. 8 is a side sectional view of a stop buffer in which the embodiment of the stop buffer shown in FIG. 1 is combined with the embodiment of the stop buffer shown in FIG. 5.

It is apparent that the two embodiments of the invention just explained could easily be combined with each other (FIG. 8). Thus, a cavity 21 could be formed in the spring body 2 of the first embodiment (FIG. 1) on the back and an insert 22 on a second sensor 7' arranged, as described with reference to FIGS. 5 to 7. The heads of the screws 20 in this case can also be countersunk either in the carrier body 3, or the support body 5 can have appropriate recesses to accommodate them. By means of such combination of both embodiments, both the monitoring functions explained previously with reference to the first embodiment could be implemented, as well as determination of complete separation of the first spring body 2 from the carrier body 3. Since such a combination solution contains two separate sensors 7 and 7', the detected events can be distinguished by means of the different sensor signals, each of which contains a sensor-specific code.

However, each embodiment can also be used in itself, when comprehensive monitoring is not deemed necessary and only a certain type of defect is primarily expected or considered to be particularly critical.

LIST OF REFERENCE NUMBERS

1 Stop buffer
2 First spring body
3 Carrier body
4 Second spring body
5 Support body
6 Fastening flange
7 sensor, 7' sensor
8 Axis
9 Axial flange section
10 Radial flange section
11 Screw
12 Cavity
13 First gap
14 Second gap
15 Recess
16 Recess
17 Fastening clamp
18 Housing
19 Angle piece
20 Screw
21 Cavity
22 Insert
23 Cutout
24 Triggering element
25 Leaf spring

The invention claimed is:

1. A stop buffer for absorption of kinetic energy released during a collision between objects, the stop buffer comprising:
   a carrier body movably mounted on a support body;
   a first spring body connected to the carrier body, the first spring body made of an elastic material;
   a second spring body holding the carrier body at a predefined distance from the support body by a bias of the second spring body when the carrier body is in a rest position; and
   a sensor including a triggering element arranged in a carrier body cavity integrally formed in a back surface of the carrier body or in a support body cavity integrally formed in a front surface of the support body such that the sensor is completely contained in at least one of the carrier body cavity integrally formed in the back surface of the carrier body and the support body cavity integrally formed in the front surface of the support body, the sensor outputting a signal when the triggering element is actuated by a force acting on the first spring body during the collision between objects, the force compressing the second spring body such that the back surface of the carrier body moves toward the front surface of the support body and stops by directly contacting the front surface of the support body.

2. The stop buffer according to claim 1, further comprising a clamp configured and arranged for fastening the sensor in the carrier body cavity integrally formed in the back surface of the carrier body or in the support body cavity integrally formed in the front surface of the support body, the clamp fastened to the carrier body or to the support body.

3. The stop buffer according to claim 1, further comprising a flange fastening the carrier body to the support body and enclosing the carrier body on all sides in an axial direction, the flange forming a stop for the carrier body when the carrier body is held in the rest position by the second spring body.

4. The stop buffer according to claim 1, further comprising a housing configured and arranged for enclosing the sensor.

5. The stop buffer according to claim 4, further comprising at least one actuation element projecting from the housing enclosing the sensor, the at least one actuation element configured and arranged to actuate the triggering element by deflecting as the carrier body moves toward the support body during the collision between objects.

6. The stop buffer according to claim 1, further comprising a second sensor including a second triggering element arranged relative to the carrier body, the second sensor outputting a signal when second the triggering element is actuated by detachment of the first spring body from the carrier body during the collision between objects.

7. The stop buffer according to claim 1, wherein the sensor comprises an electromechanical energy transducer configured for converting mechanical movement of the triggering element into electrical energy to supply the sensor.

8. The stop buffer according to claim 7, wherein the sensor further comprises a transmitter configured for wirelessly outputting the signal when supplied with an electrical pulse having a predetermined minimum energy from the electromechanical energy transducer.

9. The stop buffer according to claim 8, wherein the sensor further comprises a memory having a sensor-specific code, the sensor-specific code a component of the signal output by the transmitter.

10. A stop buffer for absorption of kinetic energy released during a collision between objects, the stop buffer comprising:
   a carrier body movably mounted on a support body, wherein the carrier body includes a carrier body cavity integrally formed in a back surface of the carrier body and the support body includes a support body cavity integrally formed in a front surface of the support body;
   a first spring body connected to the carrier body, the first spring body made of an elastic material;
   a second spring body holding the carrier body at a predefined distance from the support body by a bias of the second spring body when the carrier body is in a rest position; and
   a sensor including a triggering element arranged in a recess formed by the carrier body cavity and the support body cavity such that the sensor is completely contained in the recess, the sensor outputting a signal when the triggering element is actuated by a force acting on the first spring body during the collision between objects, the force compressing the second spring body such that the back surface of the carrier body moves toward the front surface of the support body and stops by directly contacting the front surface of the support body.

\* \* \* \* \*